(12) United States Patent
Jeon et al.

(10) Patent No.: US 8,098,360 B2
(45) Date of Patent: Jan. 17, 2012

(54) LIQUID CRYSTAL DISPLAY HAVING PARTICULAR BARRIER RIB

(75) Inventors: Kyung-Sook Jeon, Yongin-si (KR);
Jang-Soo Kim, Yongin-si (KR);
Hwa-Yeul Oh, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 407 days.

(21) Appl. No.: 12/477,342

(22) Filed: Jun. 3, 2009

(65) Prior Publication Data

US 2010/0134731 A1    Jun. 3, 2010

(30) Foreign Application Priority Data

Nov. 28, 2008 (KR) .................. 10-2008-0120018

(51) Int. Cl.
*G02F 1/1339* (2006.01)
*G02F 1/136* (2006.01)
*G02F 1/1333* (2006.01)
(52) U.S. Cl. ........... 349/156; 349/155; 349/44; 349/110
(58) Field of Classification Search ............... 349/156, 349/155, 44, 110
See application file for complete search history.

(56) References Cited

U.S. PATENT DOCUMENTS

| | | | | |
|---|---|---|---|---|
| 2007/0013839 | A1* | 1/2007 | Rho | 349/114 |
| 2010/0140621 | A1* | 6/2010 | Yang et al. | 257/59 |
| 2010/0321617 | A1* | 12/2010 | Jeon et al. | 349/110 |

FOREIGN PATENT DOCUMENTS

| | | |
|---|---|---|
| JP | 2001142064 | 5/2001 |
| JP | 2002131735 | 5/2002 |
| JP | 2002214425 | 7/2002 |
| KR | 1020040085792 | 10/2004 |
| KR | 1020070068833 | 7/2007 |
| KR | 1020070080131 | 8/2007 |
| KR | 1020070080964 | 8/2007 |
| KR | 1020070082090 | 8/2007 |
| KR | 1020070089352 | 8/2007 |
| KR | 1020070118886 | 12/2007 |

* cited by examiner

*Primary Examiner* — Mike Qi
(74) *Attorney, Agent, or Firm* — H.C. Park & Associates, PLC (57) ABSTRACT

The present application relates to a liquid crystal display including a first substrate, a plurality of gate lines, a plurality of data lines, thin film transistors connected to the gate and data lines, a barrier rib formed on the data lines, and pixel electrodes connected to the thin film transistors. The thin film transistors can be formed using a colored organic film that has an optical density in a range of 1 to 3. Color filters fill the regions surrounded by the barrier rib. Pixel electrodes can be formed on the color filters. A common electrode can be formed on the second substrate facing the first substrate. A liquid crystal layer can be situated between the first and second substrates, which are spaced apart at a predetermined distance by spacers.

25 Claims, 9 Drawing Sheets

LIQUID CRYSTAL DISPLAY HAVING PARTICULAR BARRIER RIB

CROSS REFERENCE TO RELATED APPLICATION

This application claims priority from and the benefit of Korean Patent Application No. 10-2008-0120018, filed on Nov. 28, 2008, which is hereby incorporated herein by reference for all purposes as if fully set forth herein.

BACKGROUND OF THE INVENTION

1. Field of the Invention

Embodiments of the present invention relate to a liquid crystal display.

2. Description of the Background

Liquid crystal displays (LCDs) are a popular choice for flat panel displays. A LCD generally has two display panels on which field generating electrodes such as pixel electrodes and a common electrode are formed. A liquid crystal layer may be interposed between the two display panels. In the LCD, voltages are applied to the field generating electrodes to generate an electric field over the liquid crystal layer. An alignment of liquid crystal molecules of the liquid crystal layer may be determined by the generated electric field.

A common LCD structure may have field generating electrodes provided on two display panels. A plurality of thin film transistors (TFTs) and pixel electrodes may be arranged on one of the display panels (hereinafter "TFT array panel") in the form of a matrix, and color filters of red, green, and blue may be formed on the other display panel (hereinafter "common electrode panel") with a common electrode covering the entire surface of the common electrode panel.

However in this type of LCD, alignment errors may occur due to difficulty in accurately aligning the pixel electrodes and the color filters.

To solve such a problem, a color filter on array (COA) structure may be used. The COA structure includes forming color filters and the pixel electrodes on the same display panel. When the color filters are formed together with the thin film transistors, the formation of the color filters may be made through inkjet printing. Inkjet printing is a technique where an ink solution is sprayed onto demarcated target regions so as to make colored regions. With the inkjet printing, a plurality of color filters with red, green, and blue color filters may be formed by one step, thereby simplifying the processing steps and reducing production time and cost.

When the color filters are formed through inkjet printing, the ink may be injected into the target region by using a barrier rib, which has a role of preventing the leakage of light at a boundary area of the pixels. However, the barrier rib is liable to exhibit a structural weakness with respect to afterimages, depending upon the materials thereof.

The above information disclosed in this Background section is only for enhancement of understanding of the background of the invention and therefore may contain information that does not form the prior art that is already known to a person of ordinary skill in the art.

SUMMARY OF THE INVENTION

Embodiments of the present invention provide a LCD having advantages of reducing afterimages.

Additional features of the embodiments will be set forth in the description which follows, and in part will be apparent from the description, or may be learned by practice of the invention.

An exemplary embodiment of the present invention discloses a liquid crystal display comprising a first substrate, a plurality of gate lines, a plurality of data lines, a plurality of thin film transistors, a barrier rib, a color filter, a plurality of pixel electrodes, a second substrate, a common electrode, a liquid crystal layer, and a spader. The plurality of gate lines is disposed on the first substrate. The plurality of data lines crosses the plurality of gate lines. Each thin film transistor of the plurality of thin film transistors is connected to at least one of the plurality of gate lines and to at least one of the plurality of data lines. The barrier rib is disposed on the plurality of data lines and the plurality of thin film transistors. The barrier rib comprises an organic film having an optical density in a range of 1 to 3. The color filter is disposed in a region surrounding the barrier rib. A plurality of pixel electrodes is disposed on the color filter. At least one of the plurality of pixel electrodes is connected to at least one of the thin film transistors. The second substrate faces the first substrate. The common electrode is disposed on the second substrate. The liquid crystal layer is interposed between the first substrate and the second substrate. At least one spacer separates the first substrate and the second substrates by a distance.

Another exemplary embodiment of the present invention discloses a liquid crystal display comprising a first substrate, a plurality of gate lines, a plurality of data lines, a plurality of thin film transistors, a barrier rib, a color filter, a plurality of pixel electrodes, a second substrate, a common electrode, a liquid crystal layer, at least one spacer, a light blocking member, and a subsidiary light blocking member. The first substrate comprises a display area and a peripheral area. The plurality of gate lines is disposed on the first substrate. The plurality of data lines crosses the plurality of gate lines. Each thin film transistor of the plurality of thin film transistors is connected to at least one of the plurality of gate lines and to at least one of the plurality of data lines. The barrier rib is disposed on the plurality of data lines and the plurality of thin film transistors at the display area. The barrier rib comprises a colored organic film having an optical density in a range of 1 to 3. The color filter is disposed in a region surrounding the barrier rib. The plurality of pixel electrodes is disposed on the color filter. At least one of the plurality of pixel electrodes is connected to at least one of the plurality of the thin film transistors. The second substrate faces the first substrate. The common electrode is disposed on the second substrate. The liquid crystal layer is interposed between the first substrate and the second substrate. At least one spacer is disposed in the display area. The at least one spacer separates the first substrate and the second substrate by a distance. The light blocking member is disposed on the first substrate at a peripheral area. The subsidiary light blocking member is disposed on the light blocking member. The subsidiary light blocking member comprises at least one subsidiary spacer.

Another exemplary embodiment of the present invention discloses a liquid crystal display comprising a first substrate, a plurality of gate lines, a plurality of data lines, a plurality of thin film transistors, a barrier rib, a color filter, a plurality of pixel electrodes, a second substrate, a common electrode, a liquid crystal layer, at least one spacer, a protrusion member, an overcoat, and a light blocking member. The first substrate comprises a display area and a peripheral area. The plurality of gate lines is disposed on the first substrate. The plurality of data lines crosses the gate lines. Each thin film transistors of the plurality of thin film transistors is connected to the plurality of gate lines and the plurality of data lines. The barrier rib is disposed on the plurality of data lines and the plurality of thin film transistors at the display area. The barrier rib comprises a colored organic film having an optical density in a range of 1 to 3. A color filter is disposed in a region surrounding the barrier rib. A plurality of pixel electrodes is disposed on the color filter. At least one of the plurality of pixel electrodes is connected to the thin film transistors. The second substrate faces the first substrate. The common electrode is disposed on the second substrate. The liquid crystal layer is interposed between the first substrate and the second substrate. At least one spacer is disposed in the display area. The at least one spacer separates the first substrate and the second substrate by a distance. The protrusion member is disposed in the peripheral area. The overcoat covers the protrusion member. The light blocking member is disposed on the overcoat.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Embodiments of the present invention are described more fully hereinafter with reference to the accompanying drawings in which exemplary embodiments of the invention are illustrated. Embodiments of the invention may, however, be embodied in many different forms and should not be construed as limited to the exemplary embodiments set forth herein. Rather, these exemplary embodiments are provided so that this disclosure is thorough, and will fully convey the scope of the invention to those skilled in the art. In the drawings, the sizes and relative sizes of layers and regions may be exaggerated for clarity. Detailed descriptions of well-known functions and structures incorporated herein may be omitted to avoid obscuring the subject matter of the embodiments. Like reference numerals in the drawings denote like elements.

It will be understood that when a first element or layer is referred to as being "on," "connected to" or "coupled to" another element(s) or layer(s), the first element or layer can be directly on, connected to, or coupled to the other element or layer(s) and/or intervening elements or layers may be present.

In contrast, when an element is referred to as being "directly on," "directly connected to" or "directly coupled to" another element or layer, there may be no intervening elements or layers present. As used herein, the term "and/or" includes any and all combinations of one or more of the associated listed items.

It will be understood that although the terms first, second, third etc. may be used herein to describe various elements, components, regions, layers and/or sections, these elements, components, regions, layers and/or sections should not be limited by these terms. These terms are used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments and is not intended to be limiting of the present invention. As used herein, the singular forms "a," "an" and "the" can include the plural forms as well, unless the context clearly indicates otherwise. It will be further understood that the terms "comprises" and/or "comprising," when used in this specification, can specify the presence of stated features, integers, steps, operations, elements, and/or components, but do not necessarily preclude the presence or addition of one or more other features, integers, steps, operations, elements, components, and/or groups thereof.

Example embodiments of the invention are described herein with reference to cross-sectional illustrations that are schematic illustrations of idealized example embodiments (and intermediate structures) of the present invention. As such, variations from the shapes of the illustrations as a result of, for example, manufacturing techniques and/or tolerances, are to be expected. Thus, example embodiments of the present invention should not be construed as limited to the particular shapes of regions illustrated herein but can include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
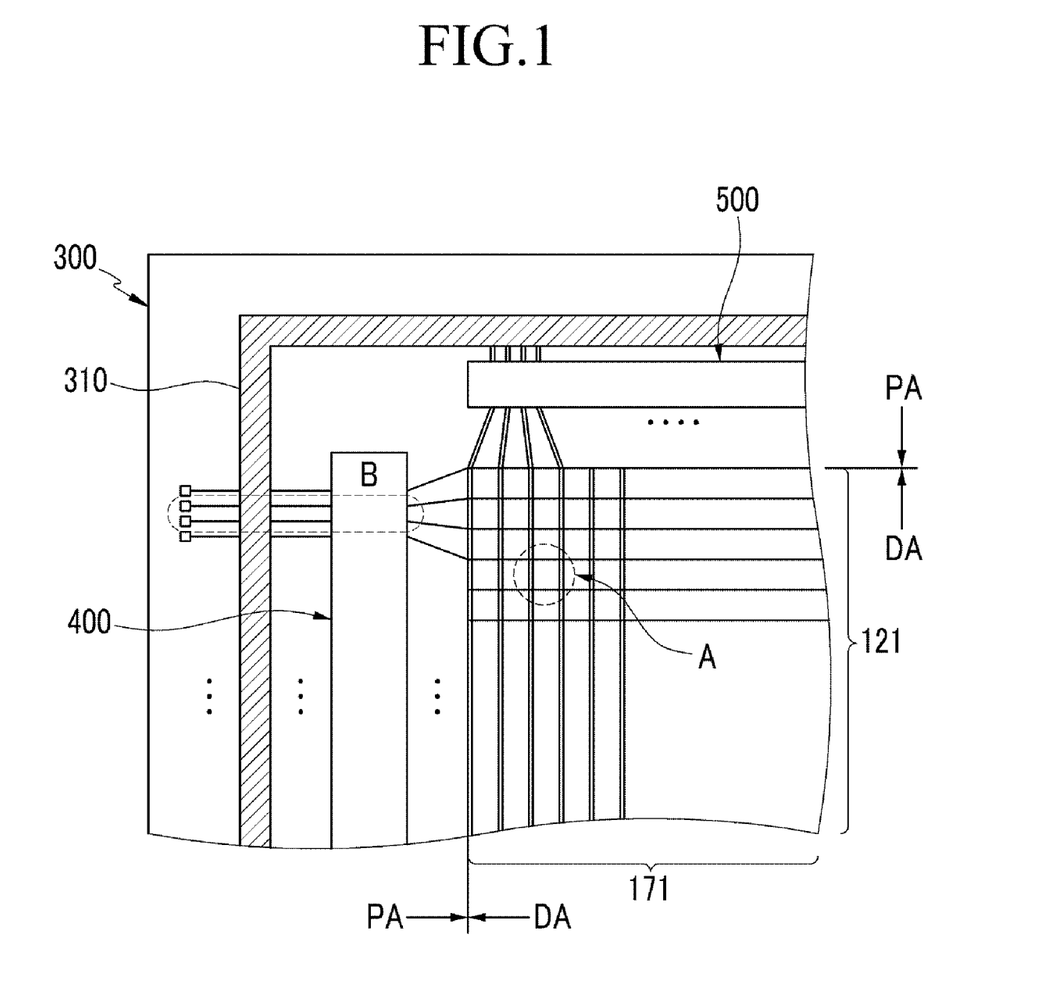
FIG. 1 is a layout view of a LCD according to an exemplary embodiment of the present invention.
Figure 2:
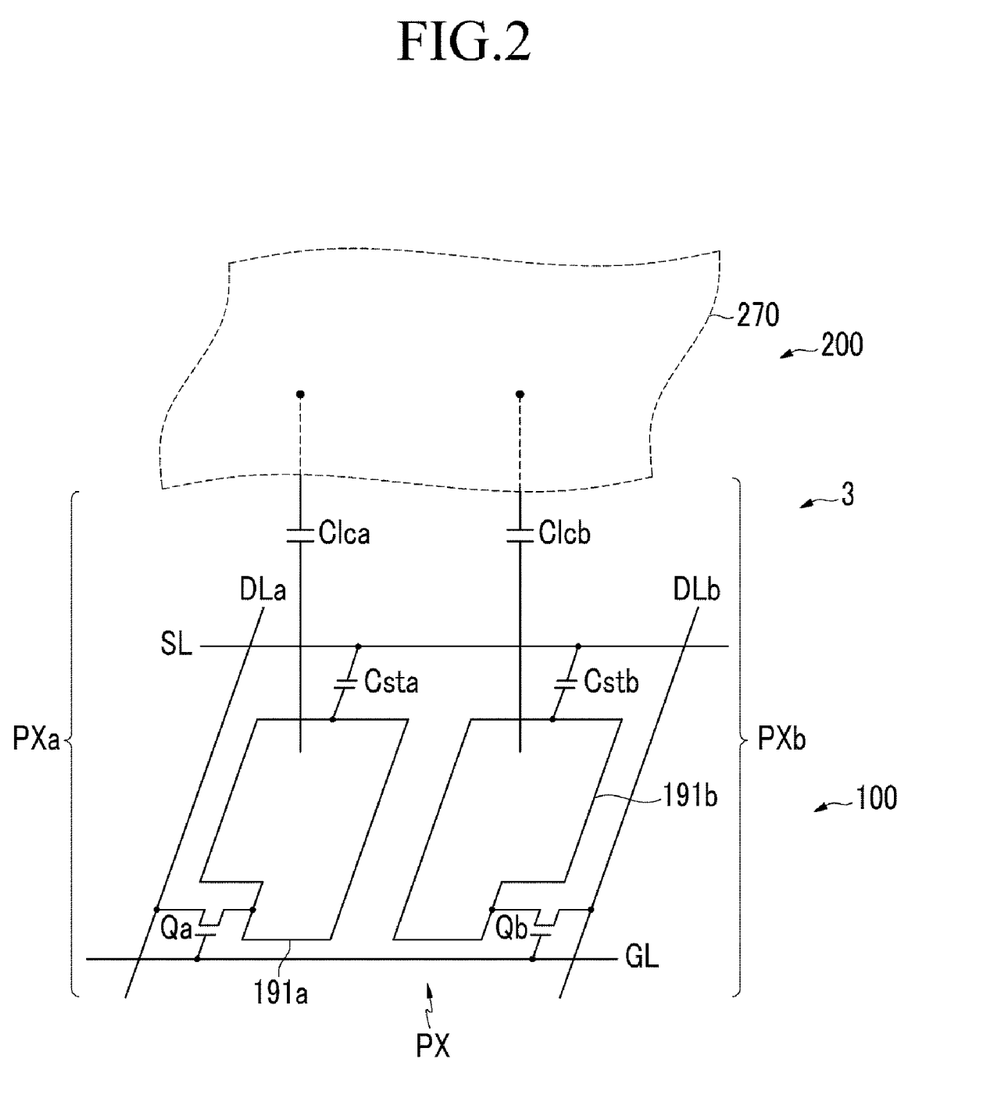
FIG. 2 is an equivalent circuit diagram of a pixel in a LCD according to an exemplary embodiment of the present invention.

FIG. 1 is a layout view of a LCD according to an exemplary embodiment of the present invention. FIG. 2 is an equivalent circuit diagram of a pixel in a LCD according to an exemplary embodiment of the present invention.

Referring to FIG. 1 and FIG. 2, a LCD may include a liquid crystal panel assembly 300, gate and data drivers 400 and 500, a gray voltage generator (not shown) connected to the data driver 500, a light source (not shown) for illuminating light to the liquid crystal panel assembly 300, a light source driver (not shown) for controlling the light source, and a signal controller (not shown) for controlling the different components of the LCD.

As shown in FIG. 2, the liquid crystal panel assembly 300 may include lower and upper panels 100 and 200, and a liquid crystal layer 3 interposed between the two panels 100 and 200. The lower panel 100 may be parallel to and/or facing upper panel 200. The liquid crystal panel assembly 300 can include a plurality of gate lines 121 arranged horizontally and a plurality of data lines 171 arranged vertically. In general, the plurality of gate lines 121 may cross (e.g., be perpendicular to) the plurality of data lines 171. The plurality of gate lines 121 and plurality of data lines 171 may form a matrix. A plurality of pixels may be connected to the gate 121 and data lines 171. It should be understood that other configurations of the pixels, data lines, and gate lines are possible. In general, any configuration enabling connectivity of each pixel to at least one gate line and at least one data line may be used. A sealant 310 can be formed at the outer boundary of the liquid crystal panel assembly 300 to seal the liquid crystal molecules of the liquid crystal layer 3. The gate driver 400 and/or the data driver 500 may be formed on the lower panel 100 of the liquid crystal panel assembly 300, or formed separately in the shape of an integrated circuit (IC) chip and coupled to the lower panel 100.

The liquid crystal layer 3 may have positive (+) or negative (−) dielectric anisotropy, and liquid crystal molecules of the liquid crystal layer 3 may be aligned such that directors thereof are standing substantially parallel or perpendicular to the surface of the two display panels 100 and 200 when an electric field is not applied in the liquid crystal layer 3.

Alignment layers (not shown) may be formed on the inner surfaces of lower and upper display panels 100 and 200. In some cases, the alignment layers may be horizontal alignment layers. Polarizers (not shown) may be formed on the outer surfaces of lower and upper display panels 100 and 200.

Referring to FIG. 2, a LCD may include a plurality of pixels PX connected to signal lines, including a plurality of gate lines GL, a plurality of pairs of data lines DLa and DLb, and a plurality of storage electrode lines SL.

The respective pixels PX may include a pair of sub-pixels PXa and PXb, which may be coupled to switching elements Qa and Qb, liquid crystal capacitors Clca and Clcb, and storage capacitors Csta and Cstb, respectively.

The switching elements Qa and Qb can be three-terminal elements such as, for example, a thin film transistor (TFT) formed on the lower panel 100. Each TFT may be connected to at least one gate line and at least one data line. For example, the control terminals of the switching elements Qa and Qb can be connected to gate line GL, the input terminals of switching elements Qa and Qb can be connected to data lines DLa and DLb, while the output terminal of switching elements Qa and Qb can be connected to the liquid crystal capacitors Clca and Clcb and the storage capacitors Csta and Cstb.

The liquid crystal capacitors Clca and Clcb may be coupled to sub-pixel electrodes 191a and 191b and a common electrode 270. For example, one terminal of the liquid crystal capacitors Clca and Clcb may be connected to the common electrode 270 and a second terminal of the liquid crystal capacitors Clca and Clcb may be connected to sub-pixel electrodes 191a and 191b. Liquid crystal layer 3 may be interposed between the two terminals as a dielectric.

Capacitance in storage capacitors Csta and Cstb may be created when a common voltage Vcom is applied to the storage electrode line SL. Storage electrode line SL with the sub-pixel electrodes 191a and 191b may overlap sub-pixel electrodes 191a and 191b and may be separated by a dielectric to yield storage capacitors Csta and Cstb.

The voltages charged at the two liquid crystal capacitors Clca and Clcb can be slightly different from one another. For example, a data voltage applied to the liquid crystal capacitor Clca can be designed and controlled to be lower or higher than the data voltage applied to liquid crystal capacitor Clcb. When voltages of the two liquid crystal capacitors Clca and Clcb are properly controlled, an image viewed from a lateral side of the liquid crystal device may be very similar to an image viewed from the frontal side of the liquid crystal device, thereby improving lateral visibility of the LCD.

Figure 3:
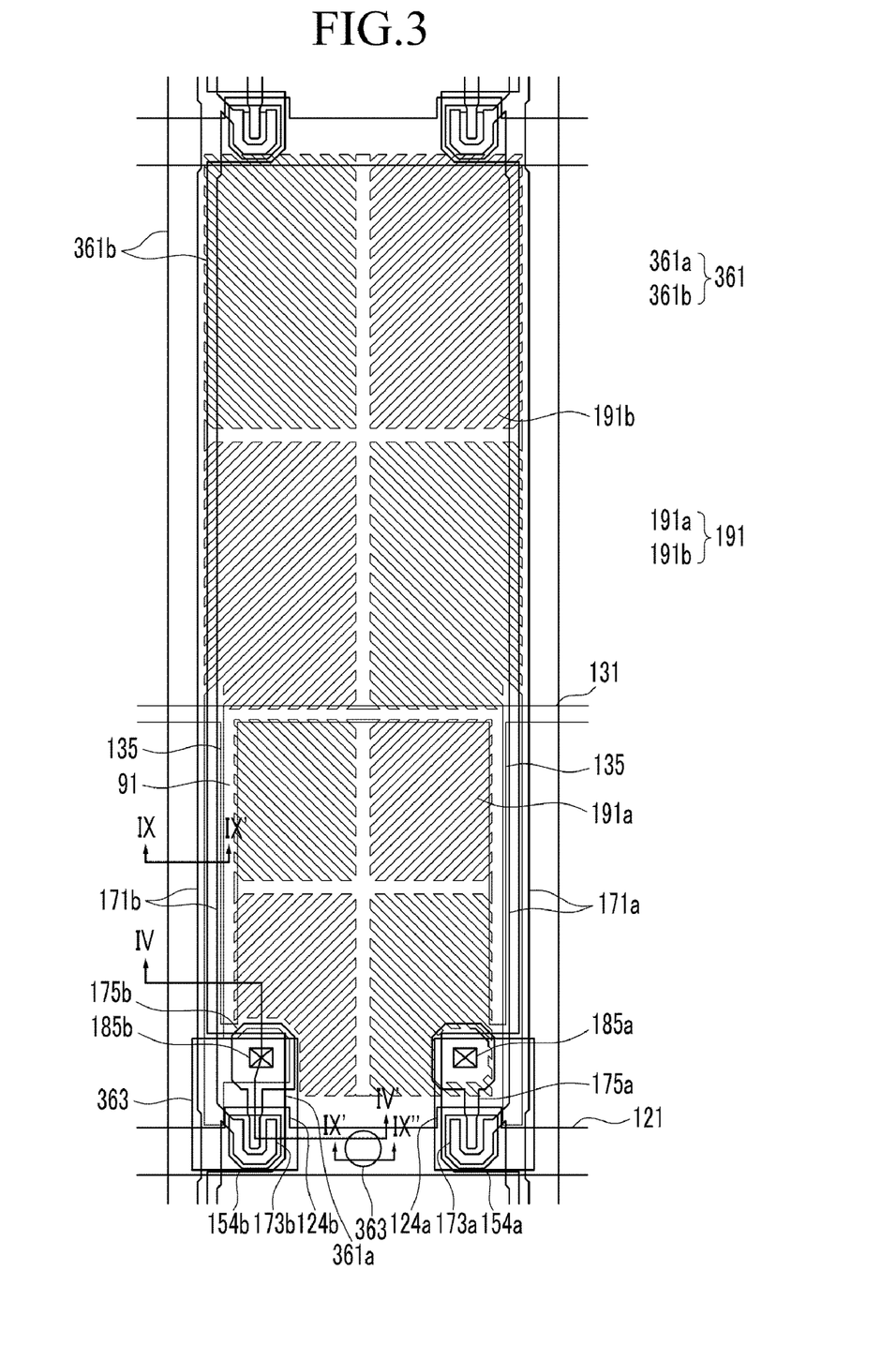
FIG. 3 is a layout view of region A in FIG. 1.
Figure 4:
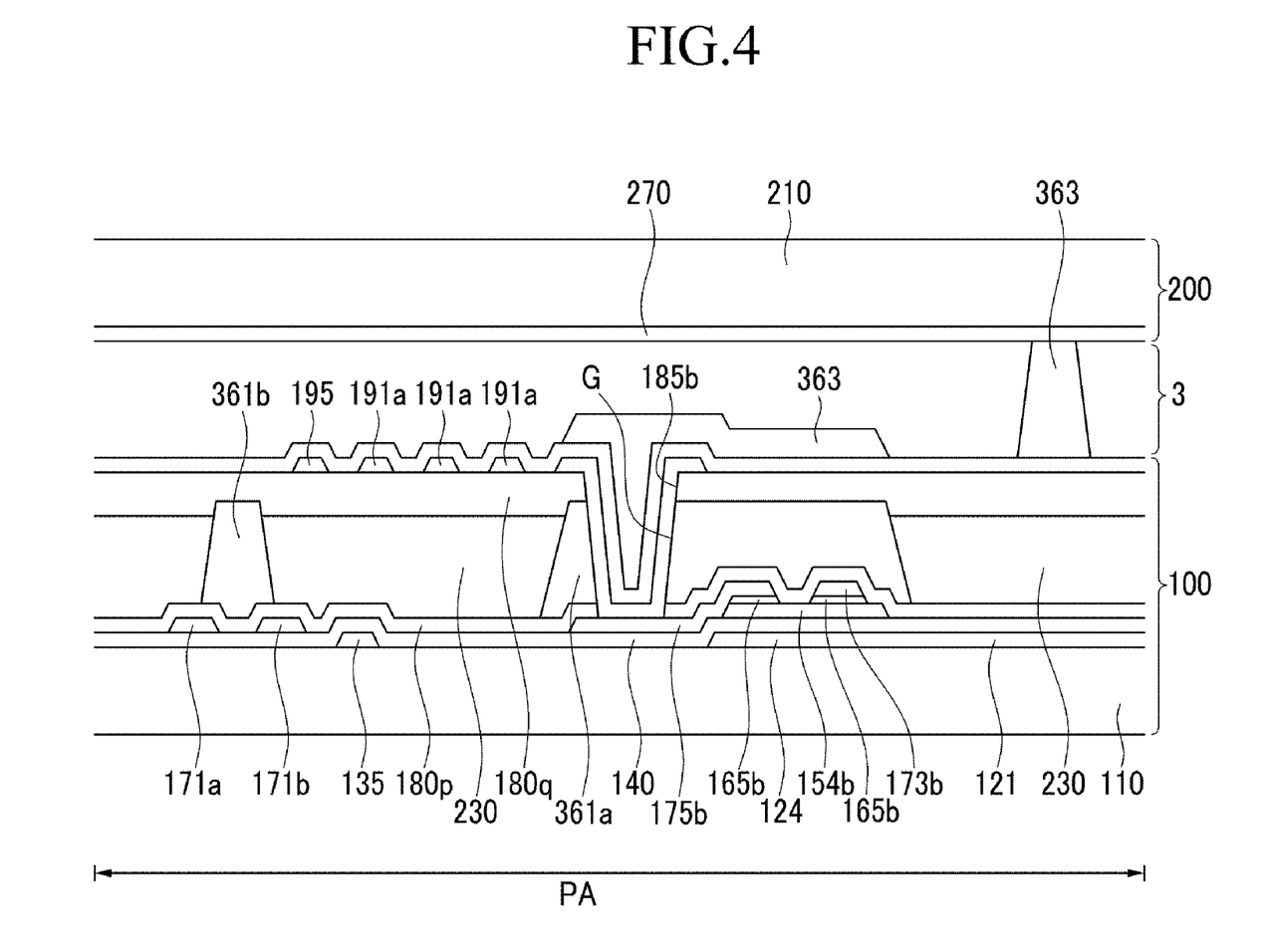
FIG. 4 is a cross-sectional view taken along line IV-IV' of FIG. 3.
Figure 5:
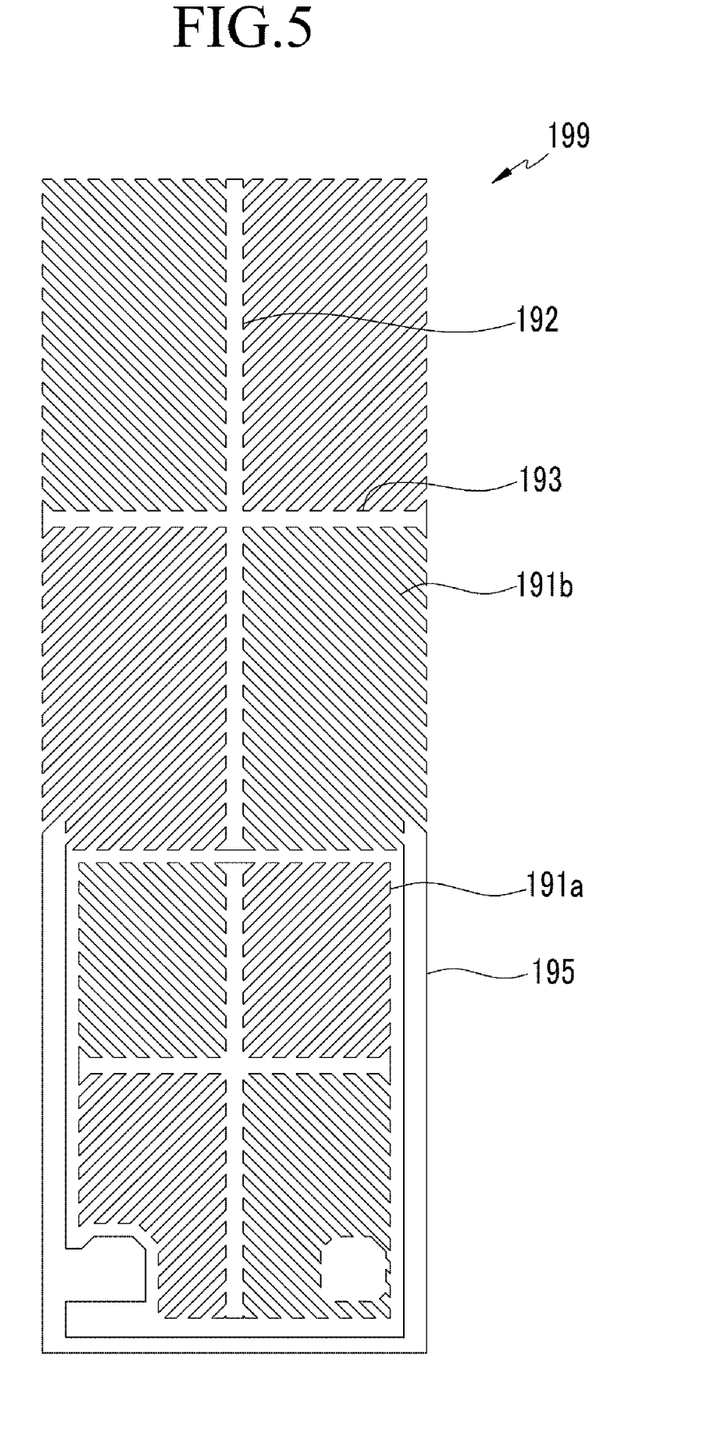
FIG. 5 is a top plan view of a pixel electrode according to an exemplary embodiment of the present invention.
Figure 6:
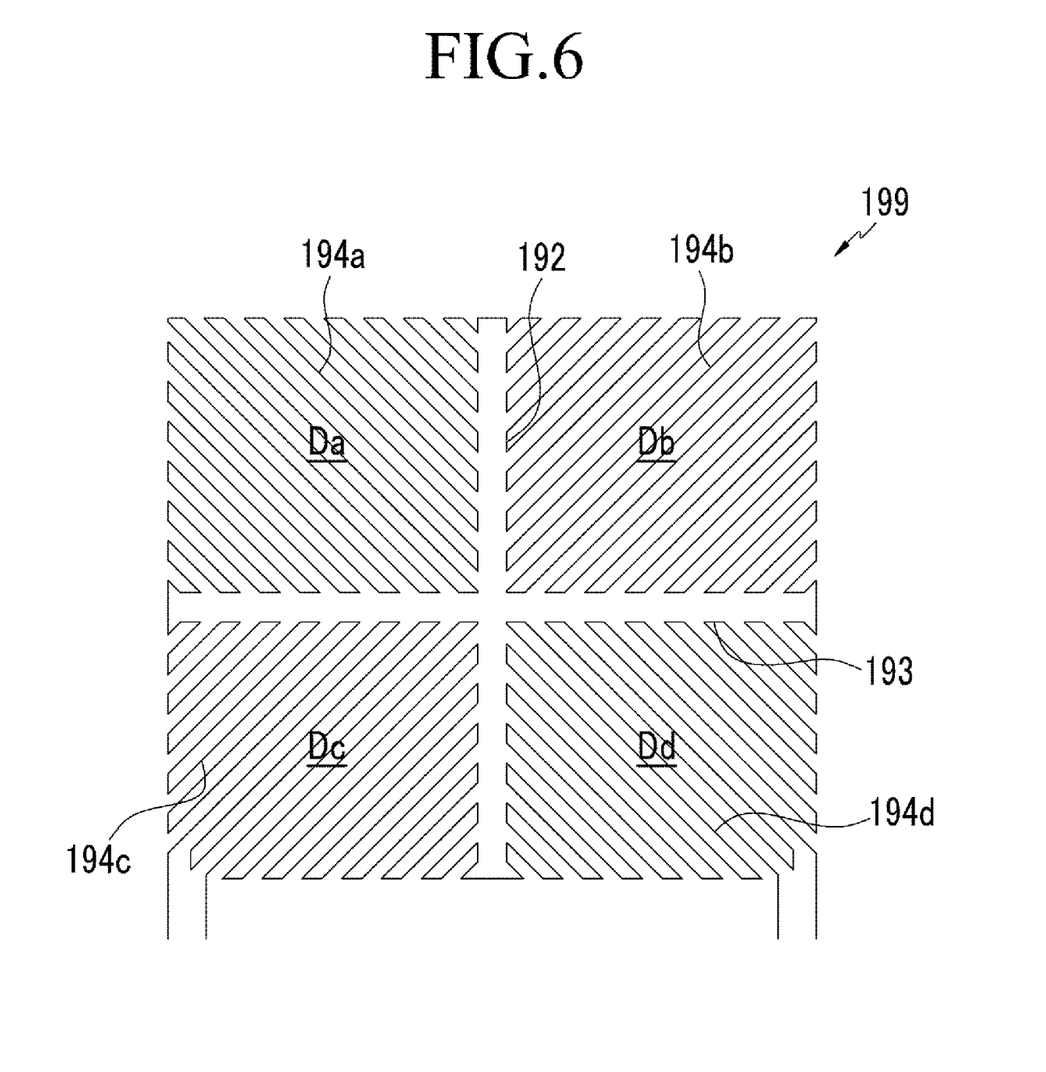
FIG. 6 is a top plan view of a basic electrode in a LCD according to an exemplary embodiment of the present invention.

A LCD according to an exemplary embodiment of the present invention will be described in detail with reference to FIGS. 3 to 6. FIG. 3 is a layout view of the "A" region in FIG. 1. FIG. 4 is a cross-sectional view taken along line IV-IV' of FIG. 3. FIG. 5 is a top plan view of a pixel electrode. FIG. 6 is a top plan view of a basic electrode in a LCD according to an exemplary embodiment of the present invention.

Referring to FIG. 3 and FIG. 4, a LCD can include lower and upper display panels 100 and 200. A liquid crystal layer 3 may be interposed between the two display panels 100 and 200. In the lower display panel 100, a plurality of gate lines 121 and a plurality of storage electrode lines 131 and 135 can be formed on an insulation substrate 110. In some cases, the gate lines 121 can transmit gate signals and can be arranged in the horizontal direction. In general, the gate lines can be arranged in any suitable configuration and orientation. Each gate line 121 may include a plurality of first and second gate electrodes 124a and 124b protruded upward.

The storage electrode lines 131 and 135 can include stems 131 arranged approximately parallel to the gate lines 121. A plurality of storage electrodes 135 may protrude from the stems 131. The shape, orientation, and disposition of the storage electrode lines 131 and 135 may be altered in various manners.

A gate insulating layer 140 can be disposed on the gate lines 121 and the storage electrode lines 131 and 135. A plurality of semiconductors 154a and 154b can be formed on gate insulating layer 140 using, for example, amorphous silicon or crystalline silicon. In general, various suitable materials may be used to construct semiconductors 154a and 154b.

A plurality of pairs of ohmic contacts 163b and 165b may be formed on the semiconductors 154a and 154b, respectively. The ohmic contacts 163b and 165b may be formed, in some cases, with silicide or with n+ hydrogenated amorphous silicon in which n-type impurities are doped at a high concentration. In general, various suitable materials may be used to construct the ohmic contacts 163b and 165b.

A plurality of pairs of data lines 171a and 171b and a plurality of pairs of first and second drain electrodes 175a and 175b may be formed on the ohmic contacts 163b and 165b and the gate insulating layer 140. Data lines 171a and 171b can communicate data signals and can be arranged in a vertical direction such that the data lines cross the gate lines 121 and the stems 131 of the storage electrode lines. In general, the data lines 171a and 171b can be arranged in any suitable shape, configuration, and/or orientation. The data lines 171a and 171b may include first and second source electrodes 173a and 173b oriented toward the first and second gate electrodes 124a and 124b. For example, first and second source electrodes 173a and 173b may be arranged in the shape of a letter U, may be disposed on the first and second gate electrodes 124a and 124b, and may face the first and second drain electrodes 175a and 175b as illustrated in FIG. 3.

The first and second drain electrodes 175a and 175b can include a first end portion partially surrounded by the first and second source electrodes 173a and 173b, a body portion extending from the first end, and a second end portion extending from the body portion. The second end portion may be connected to other layers. The shape, orientation, and disposition of the first end portion and the second end portion may be altered in various manners.

The first and second gate electrodes 124a and 124b, the first and second source electrodes 173a and 173b, and the first and second drain electrodes 175a and 175b may form first and second TFTs Qa and Qb. A channel of the first TFT Qa may be formed between first source electrode 173a and first drain electrode 175a. A channel of the second TFT Qb may be formed between second source electrode 173b and second drain electrode 175b.

The ohmic contacts 163b and 165b may be situated to lower the contact resistance in the LCD. For example, ohmic contacts 163b and 165b may be arranged between semiconductors 154a and 154b, the overlying data lines 171a and 171b, and drain electrodes 175a and 175b to lower contact resistance therebetween. Semiconductors 154a and 154b may be partially exposed since portions of semiconductors 154a and 154b may not be covered by the data lines 171a and 171b and the drain electrodes 175a and 175b. For example, a portion between the source electrodes 173a and 173b and the drain electrodes 175a and 175b may be exposed.

A lower passivation layer 180p may be formed on data lines 171a and 171b, drain electrodes 175a and 175b, and exposed portions of the semiconductors 154a and 154b. The lower passivation layer 180p may be formed, for example, using silicon nitride or silicon oxide. In general, any suitable material may be used to form the lower passivation layer 180p.

A barrier rib 361 (comprising barrier rib 361a and barrier rib 361b) may be formed on the lower passivation layer 180p. The barrier rib 361 may be formed along the gate lines 121 and the data lines 171a and 171b, and may also be disposed on or around the TFTs. The region surrounding the barrier rib 361 may be filled with a material for a color filter 230 and an upper passivation layer 180q. Regions surrounding the barrier rib 361 may have any shape or configuration and, in some cases, may be rectangular-shaped.

Barrier rib 361 may include a first barrier rib portion 361a and a second barrier rib portion 361b. The first barrier rib portion 361a may be situated on or along the TFTs and may have openings G, through which first and second drain electrodes 175a and 175b may be exposed. The second barrier rib portion 361b may be disposed between neighboring data lines 171a and 171b such that the second barrier rib portion 361b partially overlaps data lines 171a and 171b as can be seen in FIG. 4.

Color filters 230 may fill some of the regions surrounding barrier rib 361 and may be formed using inkjet printing. The upper passivation layer 180q may be situated on the color filters 230. The upper passivation layer 180q may also provide a flattening effect on the color filters 230 and the barrier rib 361.

In some cases, openings G may be formed during the step of forming the first barrier rib portion 361a. For example, a simple procedure to etch the lower passivation layer 180p may be used. However, cautionary steps such as securing a processing margin during the step of forming color filters 230 may be taken to ensure no ink is injected into the openings G.

If the openings G are previously formed, the process of etching the lower passivation layer 180p may be simplified. It may however be necessary to secure a processing margin during the step of forming color filters 230 such that the ink is not injected into the openings G.

In some cases openings G may be formed through dry-etching the first barrier rib portion 361a, or through dry-etching the first barrier rib portion 361a during the step of etching the lower passivation layer 180p. In some cases, if the openings G are previously formed, the process of etching the lower passivation layer 180p may be simplified. But it may be necessary to secure a processing margin during the step of forming color filters 230 such that the ink may not be injected into the openings G.

If the openings G are formed through dry-etching the first barrier rib portion 361a, unwanted portions of the first barrier rib portion 361a may remain. To prevent a presence of the unwanted portions, the barrier rib 361 may be formed using a material having a lower optical density (i.e., a lower dielectric constant).

A dye-colored organic material may be used to form the barrier rib 361. The organic material can be prepared by mixing a plurality of dyes whilst ensuring the optical density of the organic material remains between 1.0 and 3.0. The barrier rib 361 may have an optical density of 4.0 or more and may function as a dam for injecting ink into a target region. The barrier rib 361 may also prevent leakage of light. According to some embodiments, the barrier rib 361 may have a thickness of approximately 3 μm. In general, any suitable thickness of the barrier rib 361 may be used. In some cases, the barrier rib 361 may not contain any metals such as copper so that the etching can easily be performed.

In the peripheral area PA of the thin film transistor array panel, light blocking element may have an optical density of 4.0 or more to prevent leakage of light from the backlight. In the display area DA, little or no light may leak on the frontal side eventhough light blocking elements in the display area DA may have an optical density of less than 4.0. Potential light leakage or color mixture may be controlled from the lateral side in the display area DA. Accordingly, the desired light blocking effect in a LCD may be achieved with light blocking elements having a low optical density.

The barrier rib 361 may be formed using a hydrophobic organic film. Alternatively, the barrier rib 361 may be formed in a plasma-process using a fluorine-based gas. The fluorine-based gas may be $CF_4$ or $SF_6$. In general, any suitable process can be used to form the barrier rib 361.

The upper passivation layer 180q may be formed using a photosensitive organic material. In some cases, the upper passivation layer 180q may be formed using a negative photosensitive material such that non-illuminated portions of the upper passivation layer 180q may be developed. In some cases, the upper passivation layer 180q may have a thickness of 1.0 μm or more in order to reduce coupling of the pixel electrode 191 to the data lines 171a and 171b, and to flatten the substrate. For example, the upper passivation layer 180q may have a thickness of approximately 2.0 μm. In general, various suitable thickness and configurations of the upper passivation layer 180q may be used.

In addition to the openings G, a plurality of contact holes 185a and 185b may be formed at the upper passivation layer 180q to expose the first and second drain electrodes 175a and 175b. A plurality of pixel electrodes 191 may also be formed on the upper passivation layer 180q. The pixel electrodes 191 may be formed with transparent conductive material such as ITO and IZO or with reflective material such as aluminum, silver, chromium, and related alloys. In general, any suitable material may be used to form the pixel electrodes.

Pixel electrodes 191 may include first and second sub-pixel electrodes 191a and 191b. The first and second sub-pixel electrodes 191a and 191b may be separated from one another by a gap 91 and may include one or more basic electrodes such as the basic electrode 199 shown in FIG. 5.

Basic electrode 199 will be described in detail with reference to FIG. 5 and FIG. 6.

The basic electrode 199 may be quadrangular-shaped and may have a cross-shaped stem portion with a first stem 193 and a second stem 192. The first stem 193 may be arranged in a horizontal manner and the second stem 193 may be arranged in a vertical manner as illustrated in FIG. 5. Furthermore, the basic electrode 199 can be partitioned into sub-regions Da, Db, Dc, and Dd by way of the first 193 and second 192 stems. Sub-regions Da to Dd may have a plurality of mini-branches 194a, 194b, 194c, and 194d.

The first mini-branch 194a can be, at least partially, tilted relative to the cross-shaped stem portion and may extend from first stem 193 or second stem 192 to the top left. The second mini-branch 194b may also be, at least partially, tilted relative to the cross-shaped stem portion and may extend from first stem 193 or second stem 192 to the top right. The third mini-branch 194c can be, at least partially, tilted relative to the cross-shaped stem portion and may extend from first stem 193 or second stem 192 to the bottom left. The fourth mini-branch 194d can be, at least partially, tilted relative to the cross-shaped stem portion and may extend from first stem 193 or second stem 192 to the bottom right.

Mini-branches 194a to 194d can be tilted or orientated at an angle of approximately 45 or 135 degrees relative to the gate line 121 or the first stem 193. Mini-branches 194a to 194d of two neighboring sub-regions Da to Dd may be perpendicular to one another as shown in FIG. 5. Although not shown in the drawing, widths of portions of mini-branches 194a to 194d located in close proximity to the first stem 193 or the second stem 192 may be enlarged.

Referring back to FIGS. 2 to 5, the first and second sub-pixel electrodes 191a and 191b may include at least one basic electrode 199. In some cases, an area of the second sub-pixel electrode 191b may be larger than an area of the first sub-pixel electrode 191a. In some cases, the area of the second sub-pixel electrode 191b may be 1.0 to 2.2 times larger than the area of the first sub-pixel electrode 191a.

The second sub-pixel electrodes 191b may include a pair of branches 195 extending parallel to data lines 171. The pair of branches 195 may be connected to one another in a lower portion of the first sub-pixel electrodes 191a. The branches 195 may be disposed between the first sub-pixel electrodes 191a and data lines 171. One of the pair of branches 195 may be extended and coupled to second drain electrodes 175b through contact holes 185b. The first sub-pixel electrodes 191a may be coupled to the first drain electrodes 175a through contact holes 185a.

The first and second sub-pixel electrodes 191a and 191b can physically and electrically be connected to the first and second drain electrodes 175a and 175b through contact holes 185a and 185b and may receive data voltages from the first and second drain electrodes 175a and 175b.

Referring to the upper display panel 200 illustrated in FIG. 4, a common electrode 270 may be formed on a portion or an entire surface of a transparent insulation substrate 210. An alignment layer (not shown) may be formed on the common electrode 270.

Spacers 363 can be disposed over gate lines 121 or the TFTs to space the upper and the lower panels 200 and 100 apart by a predetermined distance. A spacer 363 formed over a TFT can be disposed to overlap the first and second source electrodes 173a and 173b and the first and second drain electrodes 175a and 175b. The spacer can also overlap and/or fill openings G of the first barrier rib portion 361a and the contact hole 185b of the upper passivation layer 180q.

Spacers 363 may be formed using an organic film having an optical density of 4 or more. Alternatively, the spacers may be formed with an organic film having an optical density in a range of 1 to 3. It should be understood that other suitable materials and films with a suitable optical density may be used.

Figure 7:
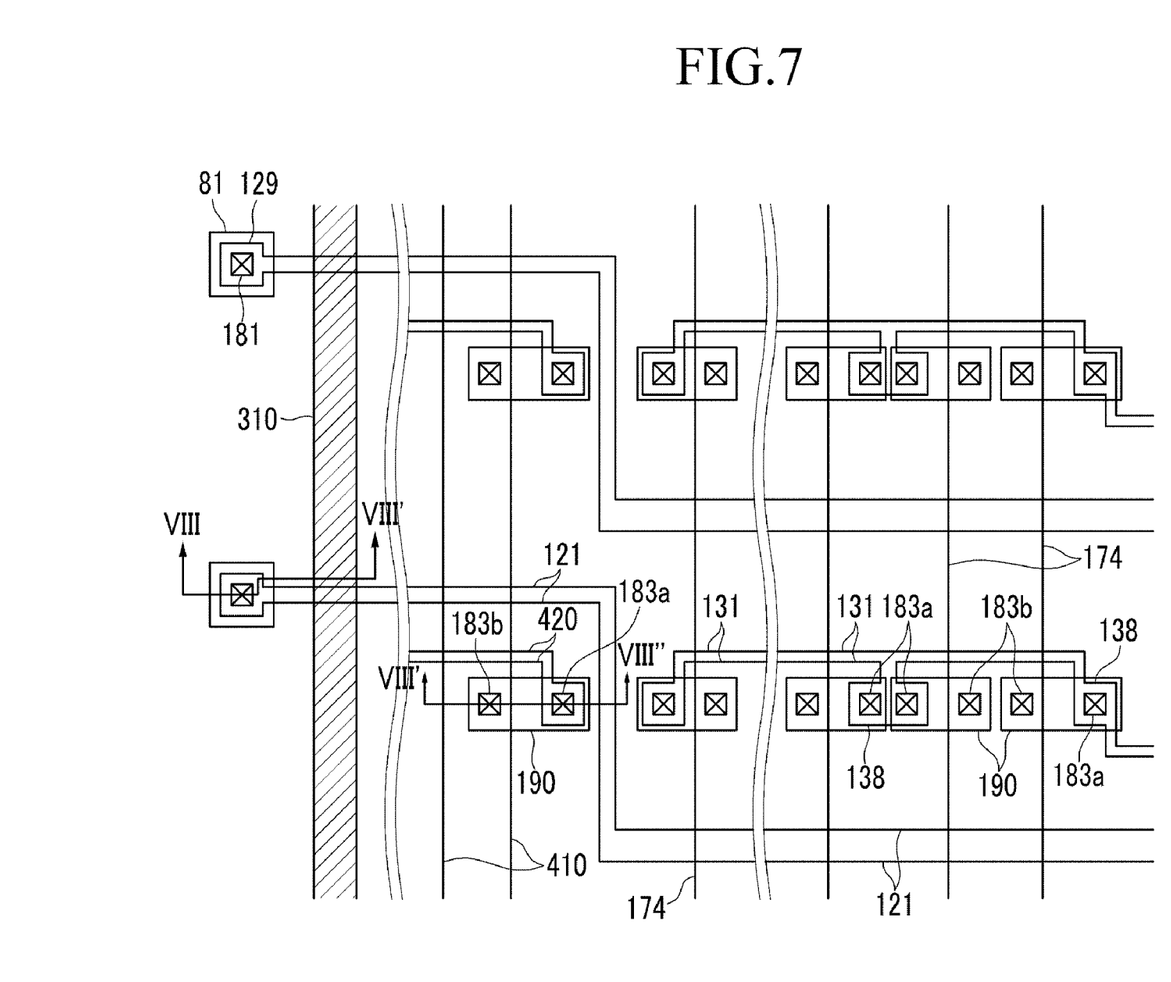
FIG. 7 is a layout view of region B in FIG. 1.
Figure 8:
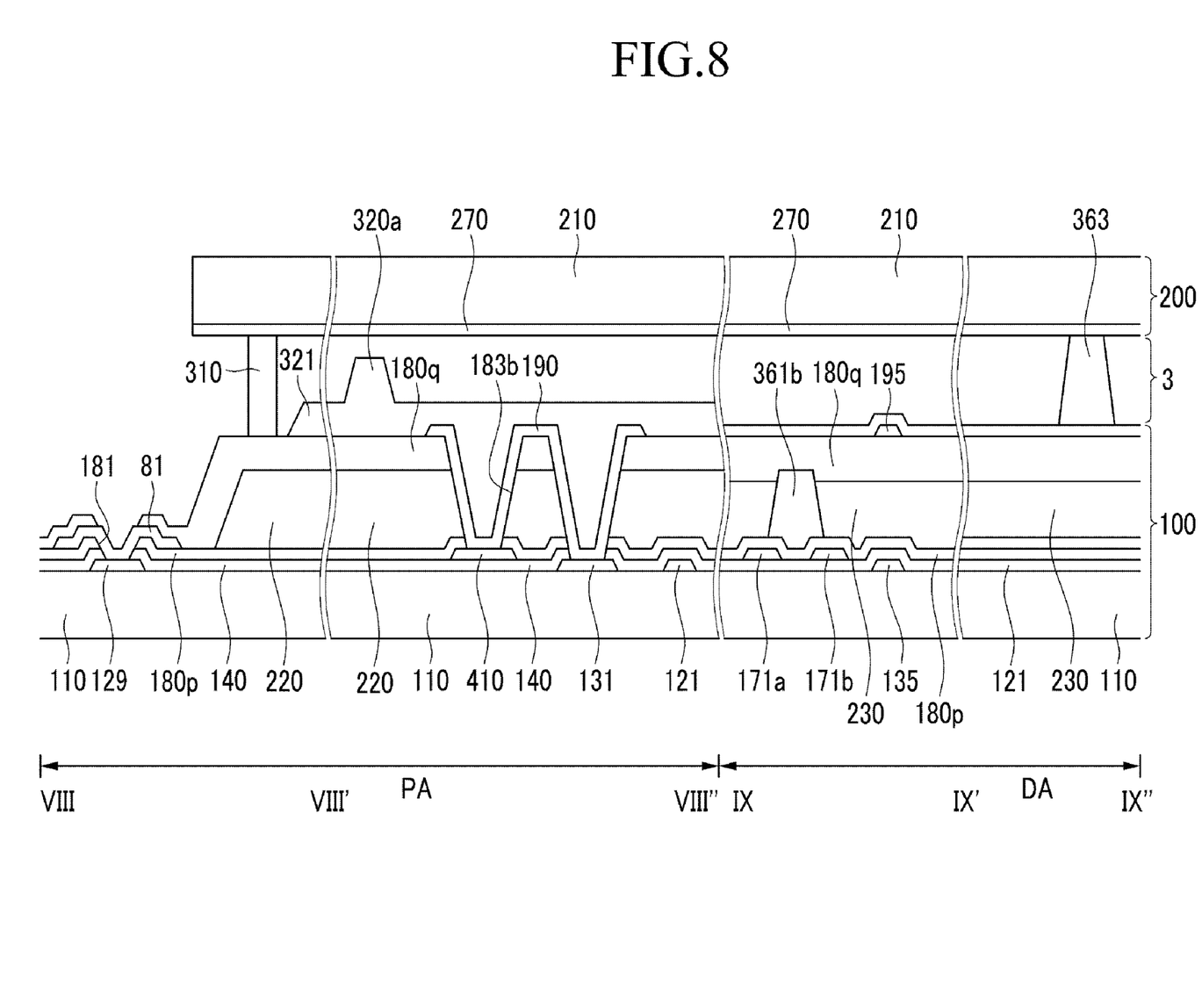
FIG. 8 is a cross-sectional view taken along lines VIII-VIII' and VIII'-VIII" of FIG. 7.
Figure 9:
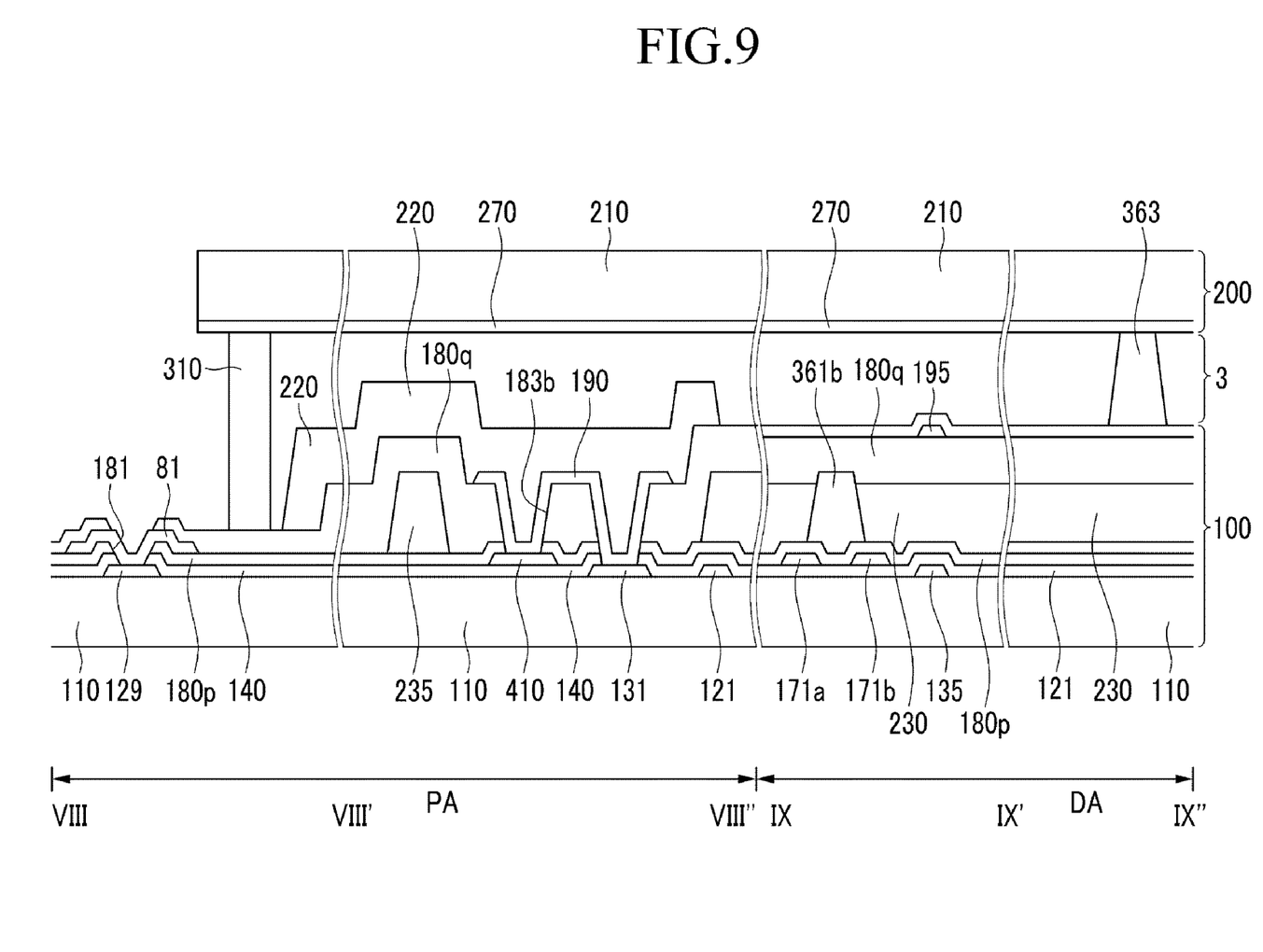
FIG. 9 is a cross-sectional view taken along the IX-IX' and IX'-IX" lines of the LCD in FIG. 3.

FIGS. 7 to 9 describe further embodiments of the present invention. FIG. 7 is a layout view of the B region in FIG. 1. FIG. 8 is a cross-sectional view taken along the VIII-VIII' and VIII'-VIII" lines of the LCD in FIG. 7. FIG. 9 is a cross-sectional view taken along the IX-IX' and IX'-IX" lines of the LCD in FIG. 3. FIG. 8 and FIG. 9 illustrate different structures formed at the peripheral area PA of the LCD.

Referring to FIG. 7 and FIG. 8, contact assistants 81 can be connected to end portions 129 of gate lines 121 and end portions 129 of data lines 171 using contact holes 181. Contact assistants 81 can assist and protect the adhesion of the end portions 129 to external devices.

Images can be displayed at the display area DA of the LCD, and a light blocking member 220 can be formed at the peripheral area PA. Light blocking member 220 can be disposed between the upper passivation layer 180q and the lower passivation layer 180p. In some cases, the light blocking member 220 may be placed external to the sealant 310. For example, the light blocking member 220 may be placed on the exterior surface of the sealant 310.

The storage electrode line 131 may be arranged on the same plane as the gate line 121 and may extend along one or more sides (e.g., left-hand and right-hand sides) of the peripheral area PA of the LCD. The storage electrode line 131 may include outer storage electrodes 138. The outer storage electrode 138 may be approximately square-shaped or rectangular-shaped. In general, the outer storage electrode 138 may have any suitable shape.

A plurality of storage electrode line connecting members 174 may be arranged on the same plane (e.g., vertically arranged) as the data lines 171 and may extend along one or more sides of the peripheral area PA of the LCD.

Transparent connectors 190 can electrically connect the storage electrode line connecting members 174 to the outer storage electrodes 138. Contact holes 183b may be formed at a contact area between the transparent connectors 190 and the storage electrode line connecting members 174. Contact holes 183a may be formed at a contact area between the transparent connectors 190 and the outer storage electrodes 138. Alternatively, in some cases, the outer storage electrodes 138 and the storage electrode line connecting members 174 may be omitted.

A gate driver 400 may be connected to the gate lines 121 and may be formed on the one or more sides (e.g., left-hand and right-hand sides) of the peripheral area PA of the LCD. The gate driver 400 may include data signal lines 410 and gate signal lines 420. The data signal lines 410 and gate signal lines 420 can be electrically connected to one another via transparent connectors 190. Gate signal lines 420 of the gate driver 400 may be formed on the same plane as the gate lines 121, and the data signal lines 410 of the gate driver 400 may be formed on the same plane as the data lines 171. Contact holes 183b may be located in the contact area between the transparent connectors 190 and the data signal lines 410 of the gate driver 400. The contact holes 183a may be formed at the contact area between the transparent connectors 190 and the gate signal lines 420. Alternatively, in some cases, the gate driver 400 may be formed on a separate IC chip instead of being formed on the lower display panel 100. In such cases, contact holes 183a and 183b through which the transparent connectors 190 contact the data signal line 410 or the gate signal line 420 of the gate driver 400 may not be used.

Spacers 363 may be formed using an organic material and may be placed in the display area DA of the LCD. A thickness of the liquid crystal layer 3 can be determined by the predetermined thickness of spaces 363. The description of the display area DA shown in FIG. 7 and FIG. 8 is the same as that of FIG. 3 and FIG. 4.

Details relevant to the peripheral area PA and the display area DA of a LCD according to exemplary embodiments of the present invention will now be described.

Light blocking member 220 may be formed using a colored organic film. In some cases, the light blocking member 220 may be formed at the same time (i.e., simultaneously) as the formation of the barrier rib 361b. The light blocking member 220 may cover some or all the regions of possible leakage of light over the insulation substrate 110 at the peripheral area PA.

An upper passivation layer 180q may be formed on the light blocking member 220. A subsidiary light blocking member 321 may be formed on the upper passivation layer 180q. The subsidiary light blocking member 321 may be formed using a colored organic film. A sum of optical densities of the subsidiary light blocking member 321 and the light blocking member 220 may be 4 or more. The light blocking member 220 and the subsidiary light blocking member 321 can overlap one another to function as a black matrix.

Subsidiary light blocking member 321 may include subsidiary spacers 320a to provide a spacer-like function in addition to preventing the leakage of light. Subsidiary spacers 320a can be formed on the subsidiary light blocking member 321 to form a stair-like (e.g., stepped different) structure as illustrated in FIG. 8. The subsidiary light blocking member 321 with the subsidiary spacers 320a may be formed using a slit mask or a halftone mask. The subsidiary light blocking member 321 may be formed at the same time (i.e., simultaneously) as the formation of spacers 363 in the display area DA. Furthermore, the subsidiary light blocking member 321 may be formed using the same material as the spacers 363.

The subsidiary spacers 320a may be formed using a suitable organic material. The subsidiary spacers 320a may be formed at the outer boundary of the display area DA, and, in some cases, may not contact the lower display panel 100. In some cases, outer boundary portions of insulating substrates 110 and 210 may be bent due to atmospheric pressure. In some cases, the outer boundary portions of insulating substrates 110 and 210 may be in contact with one another and may, after a predetermined period, detach from one another. Injected liquid crystal may move toward the sealant 310 after detachment of insulating substrates 110 and 210 from each other.

In some cases, the liquid crystal may be uniformly injected and, in other cases, the liquid crystal may be non-uniform. In some cases, the subsidiary spacers 320a may be provided to prevent movement of the substrate outer boundary portions to or from each other. In some embodiments, subsidiary spacers 320a may not be utilized and other suitable methods to prevent substrate movement may be utilized.

Color filters 230 may be formed on the upper display panel 200 or the lower display panel 100. If the color filters 230 are formed on the upper display panel 200, the color filters 230 may be absent at the outer boundary area allowing spacers and subsidiary spacers 320a to be formed at the same height. However, if color filters 230 are formed on the lower display panel 100, a height of the subsidiary spacers 320a may be smaller than a height of the spacers 363.

Referring to FIG. 9, a protrusion member 235 may be formed between the gate insulating layer 140 and the upper passivation layer 180q. The protrusion member 235, as shown in FIG. 9, may perform a similar function as the subsidiary spacer 320a described with respect to FIG. 8. In some cases, the protrusion member 235 may be formed during the step of forming the barrier rib 361b at the display area DA. In some cases, the upper passivation layer 180q and the light blocking member 220 may be formed on the protrusion member 235.

A height of the upper passivation layer 180q and the light blocking member 220 may be increased as much as a stepped difference of the protrusion member 235 so that a portion protruded from the light blocking member 220 may separate the upper and lower display panels 200 and 100 by a predetermined distance. The stepped difference may be defined as less than or equal to the height of the protrusion member 235 as illustrated in FIG. 9.

In some exemplary embodiments, the protrusion member 235 may partially cover the insulation substrate 110 in the peripheral area PA unlike the light blocking member 220 shown in FIG. 8. For example, since the light blocking member 220 and the protrusion member 235 may overlap only partially, leakage of light may occur. In order to prevent leakage of light, the light blocking member 220 may be formed with an organic film having an optical density of 4 or more. In other exemplary embodiments, the protrusion member 235 may fully cover the insulation substrate 110 in the peripheral area PA.

The spacers 363 of the display area DA may be formed with an organic film having an optical density of 4 or greater than 4. The light blocking member 220 and the spacers 363 may be formed together during the same processing step with the same material.

A method of manufacturing the LCD shown in FIG. 8 and FIG. 9 will now be described in detail.

Referring to FIG. 4 and FIG. 8 again, a method of manufacturing a LCD according to exemplary embodiments of the present invention is described below. A plurality of gate lines 121 and a plurality of storage electrode lines 131 and 135 can be formed on an insulation substrate 110. A gate insulating layer 140 can then be formed such that the gate insulating layer 140 may cover the gate lines 121 and the storage electrode lines 131 and 135. A plurality of semiconductors 154b may be formed on the gate insulating layer 140 using, for example, amorphous silicon or crystalline silicon. A plurality of pairs of ohmic contacts 163b and 165b may be formed on the semiconductors 154b using, for example, silicide or n+hydrogenated amorphous silicon (i.e., high concentration of n-type impurity doping). A plurality of pairs of data lines 171a and 171b with first and second source electrodes 173a and 173b, and a plurality of pairs of first and second drain electrodes 175a and 175b may be formed on the ohmic contacts 163b and 165b and the gate insulating layer 140. A lower passivation layer 180p may be formed on data lines 171a and 171b and drain electrodes 175b using silicon nitride or silicon oxide. A colored organic film having an optical density in a range of 1 to 3 can be coated onto the lower passivation layer 180p, and may be patterned to form a barrier rib 361 surrounding the color filters 230. The color filters 230 may be formed through inkjet printing.

The barrier rib 361 may include a first barrier rib portion 361a formed on a TFT with a source electrode 173b and a drain electrode 175b, and a second barrier rib portion 361b situated along the data lines 171a and 171b. A light blocking member 220 may be formed on the insulation substrate 110 at the peripheral area PA at the same time the barrier rib 361 may be formed.

The step of forming the barrier rib 361 and the color filters 230 will now be described more specifically.

According to some exemplary embodiments, when the first barrier rib portion 361a is formed, openings G may be formed at the first barrier rib portion 361a such that openings G may partially expose the lower passivation layer 180p. Thereafter, color filters 230 may be formed using inkjet printing in some of the regions surrounding the barrier rib 361. A processing margin can be used to ensure that ink is not injected into openings G. Thereafter, an upper passivation layer 180q may be formed on the color filters 230 with a negative photosensitive material. A lower passivation layer 180p may be dry-etched by using the upper passivation layer 180q as a mask so as to expose the drain electrodes 175b.

In some embodiments, the first barrier rib portion 361a may cover the drain electrodes 175b. Thereafter, the color filters 230 may be formed using inkjet printing in some of the regions surrounding the barrier rib 361. The lower passivation layer 180p can then be dry-etched to expose the drain electrodes 175b.

A plurality of pixel electrodes 191 may be formed on the upper passivation layer 180q. Spacers 363 may be formed on the passivation layer 180q to separate the upper and lower panels 200 and 100 by a predetermined distance. With the step of forming the upper passivation layer 180q, a subsidiary light blocking member 321 may be formed at the peripheral area PA. As shown in FIG. 8, an organic film may be coated on the entire surface of the upper passivation layer 180q, and may be patterned using a slit mask or a halftone mask such that the subsidiary light blocking member 321 may have subsidiary spacers 320a protruded upward.

Referring to FIG. 4 and FIG. 9, a different way of forming the peripheral area PA may be utilized in a method of manufacturing a LCD according to other exemplary embodiments of the present invention.

In the step of forming the barrier rib 361b of the display area DA, a protrusion member 235 may be formed on the insulation substrate 110 at the peripheral area PA. An upper passivation layer 180q and a light blocking member 220 may sequentially be formed on the protrusion member 235. The protrusion member 235 may cover a narrow portion of the insulation substrate 110 and/or may overlap a part of the light blocking member 220. Accordingly, the top surface of the light blocking member 220, which can overlap the protrusion member 235, may have a protruded portion. A slit mask or a halftone mask as shown in FIG. 8 may not be needed.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display, comprising:
a first substrate;
a plurality of gate lines disposed on the first substrate;
a plurality of data lines crossing the plurality of gate lines;
a plurality of thin film transistors wherein each thin film transistor is connected to at least one of the plurality of gate lines and to at least one of the plurality of data lines;
a barrier rib disposed on the plurality of data lines and the plurality of thin film transistors, the barrier rib comprising an organic film having an optical density in a range of 1 to 3;
a color filter disposed in a region surrounding the barrier rib;
a plurality of pixel electrodes disposed on the color filter, at least one of the plurality of pixel electrodes being connected to at least one of the plurality of thin film transistors;
a second substrate facing the first substrate;
a common electrode disposed on the second substrate;
a liquid crystal layer interposed between the first substrate and the second substrate; and
at least one spacer separating the first substrate and the second substrate by a distance.

2. The liquid crystal display of claim 1, wherein the at least one spacer is disposed over the plurality of gate lines and/or the plurality of thin film transistors.

3. The liquid crystal display of claim 2, wherein the at least one spacer overlaps the barrier rib and is partially protruded toward the second substrate.

4. The liquid crystal display of claim 3, wherein the at least one spacer comprises an organic film having an optical density of 4 or more.

5. The liquid crystal display of claim 3, wherein the at least one spacer comprises an organic film having an optical density in a range of 1 to 3.

6. The liquid crystal display of claim 1, wherein the color filter is disposed using inkjet printing.

7. The liquid crystal display of claim 1, wherein the at least one spacer has no portions overlapping the plurality of data lines.

8. A liquid crystal display, comprising:
a first substrate comprising a display area and a peripheral area;
a plurality of gate lines disposed on the first substrate;
a plurality of data lines crossing the plurality of gate lines;
a plurality of thin film transistors wherein each thin film transistor is connected to at least one of the plurality of gate lines and to at least one of the plurality of data lines;
a barrier rib disposed on the plurality of data lines and the plurality of thin film transistors at the display area, the barrier rib comprising a colored organic film having an optical density in a range of 1 to 3;
a color filter disposed in a region surrounding the barrier rib;
a plurality of pixel electrodes disposed on the color filter, at least one of the plurality of pixel electrodes being connected to at least one of the plurality of thin film transistors;
a second substrate facing the first substrate;
a common electrode disposed on the second substrate;
a liquid crystal layer interposed between the first substrate and the second substrate;
at least one spacer disposed in the display area, the at least one spacer separating the first substrate and the second substrate by a distance;
a light blocking member disposed on the first substrate at the peripheral area; and
a subsidiary light blocking member disposed on the light blocking member, the subsidiary light blocking member comprising at least one subsidiary spacer.

9. The liquid crystal display of claim 8, wherein the light blocking member and the subsidiary light blocking member comprise a colored organic film, and a sum of an optical density of the light blocking member and the subsidiary light blocking member is 4 or more.

10. The liquid crystal display of claim 9, wherein the at least one spacer is disposed over the plurality of gate lines and/or the plurality of thin film transistors.

11. The liquid crystal display of claim 10, wherein the at least one spacer overlaps the barrier rib and is partially protruded toward the second substrate.

12. The liquid crystal display of claim 11, wherein the at least one spacer comprises a colored organic film having an optical density in a range of 1 to 3.

13. The liquid crystal display of claim 12, wherein the subsidiary light blocking member and the at least one spacer are disposed simultaneously.

14. The liquid crystal display of claim 9, wherein the light blocking member and the barrier rib are disposed simultaneously.

15. The liquid crystal display of claim 14, wherein the subsidiary light blocking member comprising the at least one subsidiary spacer is disposed using a slit mask or a halftone mask.

16. The liquid crystal display of claim 8, wherein the color filter is disposed using inkjet printing.

17. The liquid crystal display of claim 8, wherein the at least one spacer has no portions overlapping the plurality of data lines.

18. A liquid crystal display, comprising:
a first substrate comprising a display area and a peripheral area;
a plurality of gate lines disposed on the first substrate;
a plurality of data lines crossing the plurality of gate lines;
a plurality of thin film transistors wherein each thin film transistor is connected to at least one of the plurality of gate lines and to at least one of the plurality of data lines;
a barrier rib disposed on the plurality of data lines and the plurality of thin film transistors at the display area, the barrier rib being comprising a colored organic film having an optical density in a range of 1 to 3;
a color filter disposed in a region surrounding the barrier rib;
a plurality of pixel electrodes disposed on the color filter, at least one of the plurality of pixel electrodes being connected to the plurality of thin film transistors;
a second substrate facing the first substrate;
a common electrode disposed on the second substrate;
a liquid crystal layer interposed between the first substrate and the second substrate;
at least one spacer disposed in the display area, the at least one spacer separating the first substrate and the second substrate by a distance;
a protrusion member disposed in the peripheral area;
an overcoat covering the protrusion member; and
a light blocking member disposed on the overcoat.

19. The liquid crystal display of claim 18, wherein the light blocking member has an optical density of 4 or more.

20. The liquid crystal display of claim 19, wherein the light blocking member has a first protrusion overlapping the protrusion member, the first protrusion having a stepped difference from a top surface of the light blocking member, the stepped difference being less than or equal to a height of the protrusion member.

21. The liquid crystal display of claim 20, wherein the at least one spacer is disposed over the plurality of gate lines and/or the plurality of thin film transistors.

22. The liquid crystal display of claim 21, wherein the at least one spacer overlaps the barrier rib and is partially protruded toward the second substrate.

23. The liquid crystal display of claim 22, wherein the at least one spacer comprises an organic film having an optical density of 4 or more.

24. The liquid crystal display of claim 18, wherein the protrusion member and the barrier rib are disposed simultaneously.

25. The liquid crystal display of claim 18, wherein the at least one spacer has no portions overlapping the plurality of data lines.

* * * * *